UNITED STATES PATENT OFFICE.

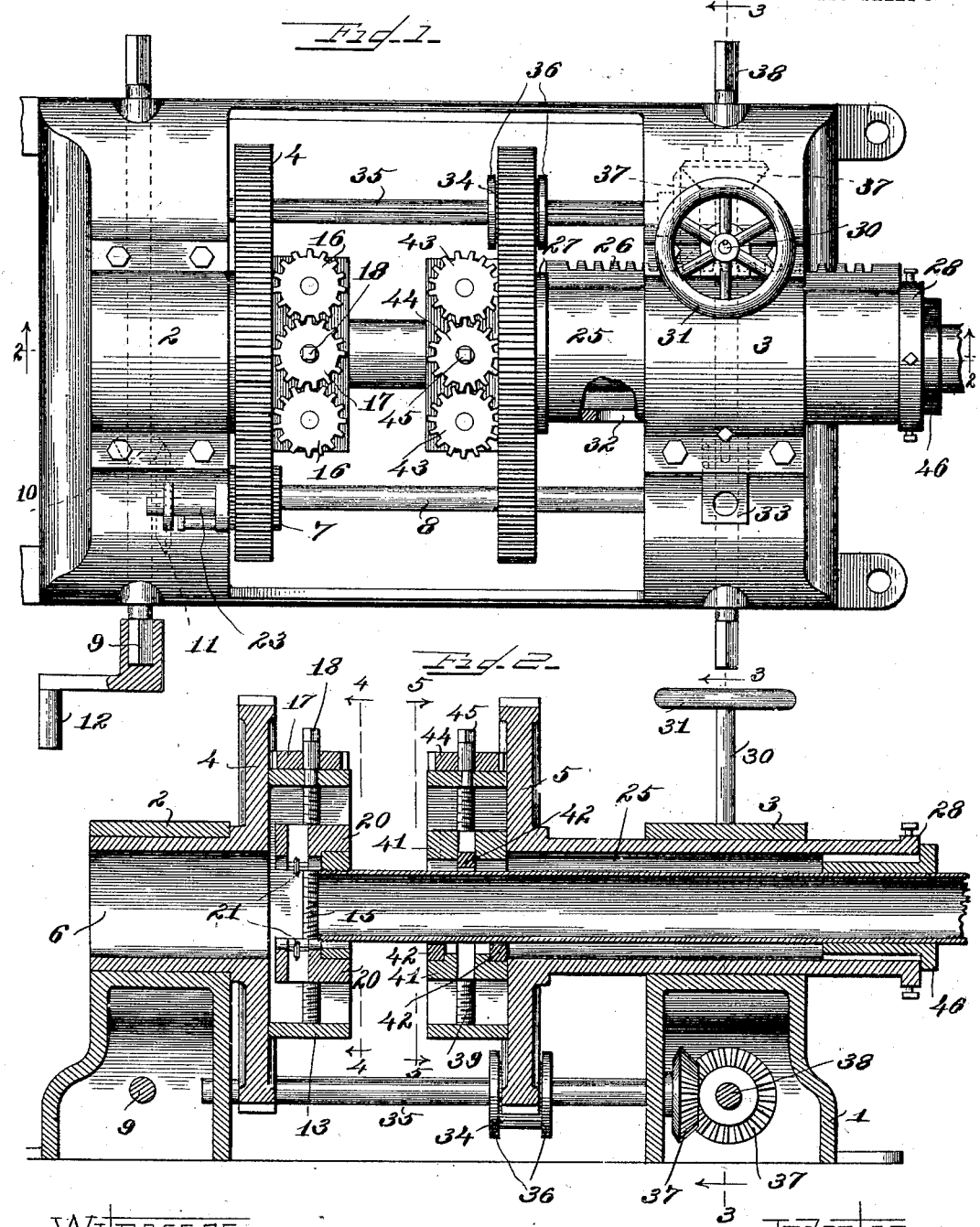

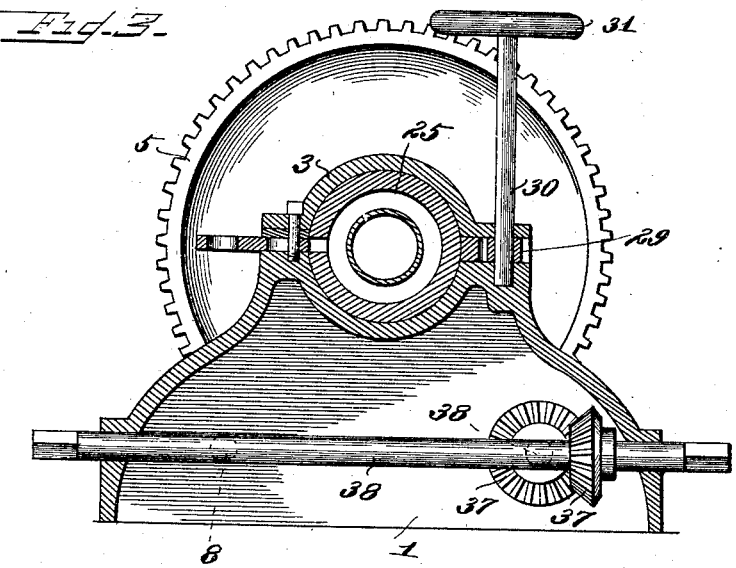
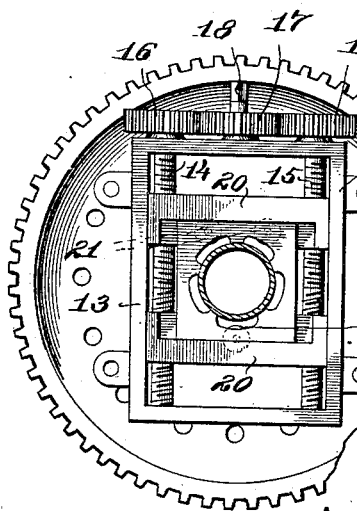
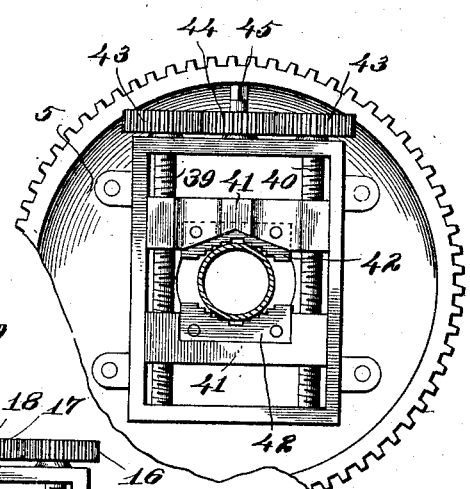
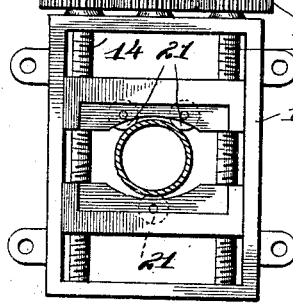

JEAN B. DUMAIS, OF CHICAGO, ILLINOIS, ASSIGNOR OF TWO-THIRDS TO JOSEPH C. WOLFF, OF CHICAGO, ILLINOIS.

PIPE CUTTING AND THREADING MACHINE.

SPECIFICATION forming part of Letters Patent No. 722,090, dated March 3, 1903.

Application filed August 27, 1902. Serial No. 121,166. (No model.)

*To all whom it may concern:*

Be it known that I, JEAN B. DUMAIS, a citizen of the United States, residing at Chicago, in the county of Cook and State of Illinois, have invented certain new and useful Improvements in Pipe Cutting and Threading Machines, of which the following is a specification.

One of the objects of this invention is the production of an improved pipe cutting and threading machine.

A further object is the production of a thread-cutting machine wherein the cutting-dies and the pipe may be rotated in contrary directions and, further, wherein either may be locked in position and the other rotated.

In the accompanying drawings, Figure 1 is a top plan view of a pipe cutting and threading machine embodying the features of my invention. Fig. 2 is a longitudinal vertical section on dotted line 2 2 of Fig. 1. Fig. 3 is a transverse vertical section on dotted line 3 3 of Fig. 1. Fig. 4 is a face view of the rotatable cutter-head, shown on dotted line 4 4 of Fig. 2. Fig. 5 is a face view of the clamping-head, shown on dotted line 5 5 of Fig. 2. Fig. 6 is a view of the cutter-head with the thread-cutting die removed.

In the embodiment herein shown of this invention I provide a machine-body 1, which body may be supported upon a suitable table or framework (not shown) to raise it a convenient distance above the floor. At opposite ends of the body portion two alined bearing-boxes 2 and 3 are provided, the former for rotatably supporting the cutter-head 4, the latter for rotatably supporting the clamping-head 5.

The cutter-head 4 is fixed with relation to a tubular stem 6, which stem is journaled in the bearing-box 2. The head 4 is provided on its periphery with gear-teeth, and these teeth mesh with the similar teeth of the pinion 7, fixed upon the shaft 8, which shaft is rotatably connected with the transverse drive-shaft 9 by means of the bevel-pinions 10 and 11. The pinion 11 is a little more than twice the diameter of the pinion 10, so that the rate of rotation of the shaft 8 is a little less than one to two with relation to the rotative speed of the drive-shaft 9. Said shaft 9 is squared at its end to receive a crank 12. A balance-wheel (not shown) is also sometimes provided for the end of this shaft, and when the machine is to be operated by power a pulley (not shown) is fixed on the end of said shaft.

Upon the face of the cutter-head 4 I secure the clamping-framework 13, (shown in Fig. 4,) having the two parallel shafts 14 and 15, each screw-threaded right hand at one end and left hand at the opposite end. At one end of said shafts are fixed the gears 16, connected by the intermeshing gear 17, carried by the shaft 18. This shaft 18 is squared at its upper end to receive a wrench 19 for rotating the screw-threaded shafts 14 and 15 to move the clamping-bars 20, mounted upon opposite ends of said screw-threaded shafts. By turning the wrench 19, and thus rotating the shafts 14 and 15, these clamp-bars are made to approach or recede, and the thread-cutting die may be clamped firmly between them. The cutter-disks 21 are rotatably mounted upon the clamping-bars 20, and by means of the adjustment just described of said bars said cutter-disks may be moved toward or from their work.

A sliding bolt 23, lying within a suitable opening in the body portion 1, is adapted to engage in one of the circular series of holes 24 formed in said cutter-head in order to hold said head in a fixed position when its rotation is not desired.

The clamping-head 5 is fixed with relation to a tubular stem 25, rotatably supported within the bearing-box 3 of the body portion 1. Said stem 25 is arranged to be slid backward and forward in said bearing-box by means of a rack 26, held between the shoulder 27 on the clamping-head and the flange 28 on said stem, the teeth of said rack meshing with the teeth of a pinion 29, fixed upon a rotatable shaft 30, the upper end of which shaft carries a hand-wheel 31, intended to be grasped by the operator to feed the clamping-head toward and from the cutter-head.

The tubular stem 25 is provided in its side with a longitudinal slot 32, which slot is intended to receive a bolt 33, slidably mounted in a suitable opening in the side of the bearing-box 3, the function of said bolt being, when pushed forward into engagement with the slot 32 in said tubular stem, to hold the clamping-head from rotation, which is desirable when only the cutter-head is to be rotated.

The clamping-head 5 is provided with a peripheral series of teeth adapted to mesh with the teeth of a pinion 34, slidably mounted upon but rotatably connected with a shaft 35, journaled in the lower part of the body 1. This pinion slides upon its shaft with the movement of the clamping-head, being held in engagement with the teeth of said head by means of the side flanges 36 on said pinion. The shaft 35 is rotated by means of the bevel-gear (37) connection between it and the shaft 38, extending transversely therewith, the ends of which latter shaft project from the sides of the body 1 and are squared to receive a crank for the hand rotation of said last-mentioned shaft. It is apparent that a pulley instead of a crank may be placed upon this shaft when it is desirable to operate the machine by power. The clamping-head is provided upon its face with a clamping-frame similar to that upon the cutter-head 4, 39 and 40 being the oppositely-threaded shafts, 41 the clamping-bars, 42 the clamping-jaws, roughened to more effectively grasp the pipe, 43 the gears at the ends of said shafts, and 44 the intermeshing gear fixed upon the shaft 45, having a squared end for receiving an adjusting-wrench. (Not shown.)

In order to hold the pipe centrally within the stem 25, I provide bushings 46, of different sizes for the different diameters of pipe.

In operation a pipe to be threaded is inserted within the stem 25 of the clamping-head 5, a wrench placed upon the squared end of the shaft 45, and the clamping-jaws 42 forced downward upon the pipe. A thread-cutting die is placed in the cutter-head, between the clamping-bars 20 thereof, and said bars adjusted to clamp the die firmly between them. Power is applied to the shaft 9 and communicated through the gears 10, 11, and 7 to the cutter-head. The clamping-head may be locked in position by inserting the bolt 33 in the slot 32 in the stem 25 of the clamping-head, or said head may be rotated in a direction contrary to that of the cutter-head by applying power (either by crank or by belt and pulley) to the shaft 38, which power is communicated from said shaft to the clamping-head by means of the bevel-gears 37 and the pinion 34 on the shaft 35. The pipe held within the clamping-jaws 42 is fed forward into contact with the cutting-die by means of the hand-wheel 31, the teeth of the pinion 29, fixed to the shaft 30, that supports said hand-wheel, meshing with the rack 26. Screw-threads of any length may be cut by releasing the grip of the clamping-jaws upon the pipe when the clamping-head has been fed forward to the limit of its movement, returning said head to its original position, tightening the clamping-jaws upon the pipe, and again feeding the pipe forward. This is repeated until the desired length of thread is obtained.

When it is desirable to cut off a portion of a pipe held in the clamping-jaws, the thread-cutting die is removed, the cutting-disks set against the pipe at the point where the cut is desired, the bolt 23 slid into one of the openings 24 in the cutter-head, and the clamping-head rotated. As the incision deepens, the cutting-disks are fed toward the pipe by rotating the screw-threaded shafts 14 and 15 by means of a wrench set upon the squared end of the shaft 18.

By the means herein shown for separately rotating the cutter-head and the clamping-head the effect of two speeds is obtained without complicated gear changes. To operate the machine expeditiously, two workmen are required, one standing at each side of the machine. When manual power is employed for driving the machine, it is desirable that both workmen contribute to it, and to attain this result I have arranged the double driving means hereinbefore shown and described. On the other hand, when the machine is to be operated by a single workman the clamping-head may readily be locked in position and only the cutter-head rotated.

It is apparent that various changes might be resorted to in the general form and arrangement of the several parts herein described without departing from the spirit and scope of my invention, wherefore I wish to have it understood that I do not desire to limit myself to the precise details set forth.

I claim as my invention—

1. In a pipe-threading machine, in combination, a supporting-frame provided with a bearing-box; a tubular stem rotatably supported in said bearing-box, said stem being provided with a longitudinal slot; a clamping-head fixed with relation to said tubular stem; means for rotating said clamping-head; a bolt slidably supported on said framework and adapted to enter the slot in said tubular stem to lock said clamping-head from rotation; a cutter-head; means for rotating said cutter-head; and means for moving said clamping-head toward and from said cutter-head.

2. In a pipe-threading machine, in combination, a supporting-frame provided with a bearing-box; a tubular stem rotatably supported in said bearing-box; a clamping-head fixed with relation to said tubular stem; a flange on said stem; a rack held between said clamping-head and said flange and sliding in a groove in said bearing-box; a pinion in mesh with said rack; means for rotating said pinion; peripheral gear-teeth on said clamping-head; a rotatable shaft journaled in said supporting-frame; a pinion slidably mounted on said shaft but rotatably connected therewith, said pinion being provided with side flanges for holding it in engagement with the peripheral gear-teeth of said clamping-head; and means for rotating said shaft.

3. In a pipe-threading machine, in combination, a supporting-frame provided with two alined bearing-boxes; a tubular stem rotatably supported in one of said bearing-boxes; a clamping-head fixed with relation to said tubular stem; a flange on said stem; a rack held between said clamping-head and said flange and sliding in a groove in said bearing-box; a pinion in mesh with said rack; means for rotating said pinion; peripheral gear-teeth on said clamping-head; a rotatable shaft journaled in said supporting-frame; a pinion slidably mounted on said shaft but rotatably connected therewith, said pinion being provided with side flanges for holding it in engagement with the peripheral gear-teeth of said clamping-head; means for rotating said shaft; a tubular stem rotatably supported in the other of said alined bearing-boxes; a cutter-head fixed with relation to said last-mentioned tubular stem, said cutter-head being provided with a series of openings; a bolt slidably supported on said framework and adapted to enter one of said openings; and means for rotating said cutter-head.

JEAN B. DUMAIS.

Witnesses:
L. L. MILLER,
GEO. L. CHINDAHL.